(12) United States Patent
Doshi et al.

(10) Patent No.: US 7,508,787 B2
(45) Date of Patent: Mar. 24, 2009

(54) GRAPHICAL SELECTION OF INFORMATION DISPLAY FOR WIRELESS MESH HIERARCHIES

(75) Inventors: Bhautik Doshi, Fremont, CA (US); Raymond Todd Truitt, Denver, CO (US); Gregg Scott Davi, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 188 days.

(21) Appl. No.: 11/624,340

(22) Filed: Jan. 18, 2007

(65) Prior Publication Data

US 2007/0280165 A1    Dec. 6, 2007

Related U.S. Application Data

(60) Provisional application No. 60/809,689, filed on May 31, 2006.

(51) Int. Cl.
*H04Q 7/24* (2006.01)

(52) U.S. Cl. ...................... 370/328; 370/338

(58) Field of Classification Search ........... None
See application file for complete search history.

(56) References Cited

U.S. PATENT DOCUMENTS

| | | | |
|---|---|---|---|
| 6,370,538 | B1 | 4/2002 | Lamping et al. |
| 2001/0030667 | A1 | 10/2001 | Kelts |
| 2003/0236827 | A1 | 12/2003 | Patel et al. |
| 2005/0232281 | A1 | 10/2005 | Rosenzweig et al. |
| 2005/0282540 | A1 | 12/2005 | Motamedi et al. |
| 2006/0019679 | A1 | 1/2006 | Rappaport et al. |

OTHER PUBLICATIONS

HotView® Mesh Management System, Data Sheets, Firetide, www.firetide.com, http://www.firetide.com/datasheets/hotview_ds_030205.pdf, Mar. 2005.

OmniNode 2005, Omnilux Product Overview, www.omnilux.com, copyright 2006.

*Primary Examiner*—Erika A Gary
(74) *Attorney, Agent, or Firm*—Baker Botts L.L.P.

(57) ABSTRACT

In one embodiment, a method includes displaying a geographical map illustrating locations of a plurality of wireless nodes of a mesh network; displaying a hierarchically-arranged filter that shows a hierarchical relation of the plurality of wireless nodes; receives a filter configuration; and displaying in the geographical map a subset of the plurality of wireless nodes based on the filter configuration.

24 Claims, 11 Drawing Sheets

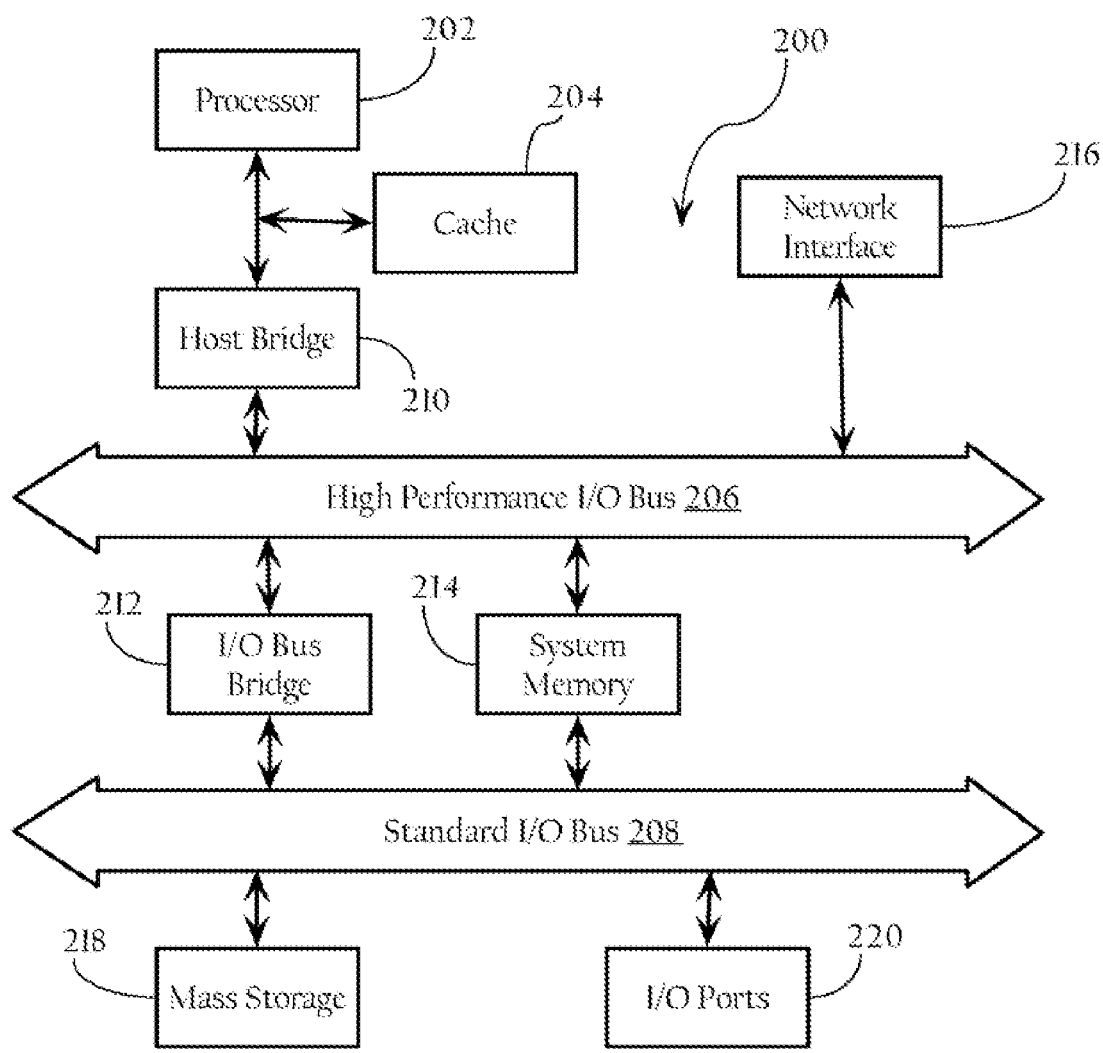
Fig._2

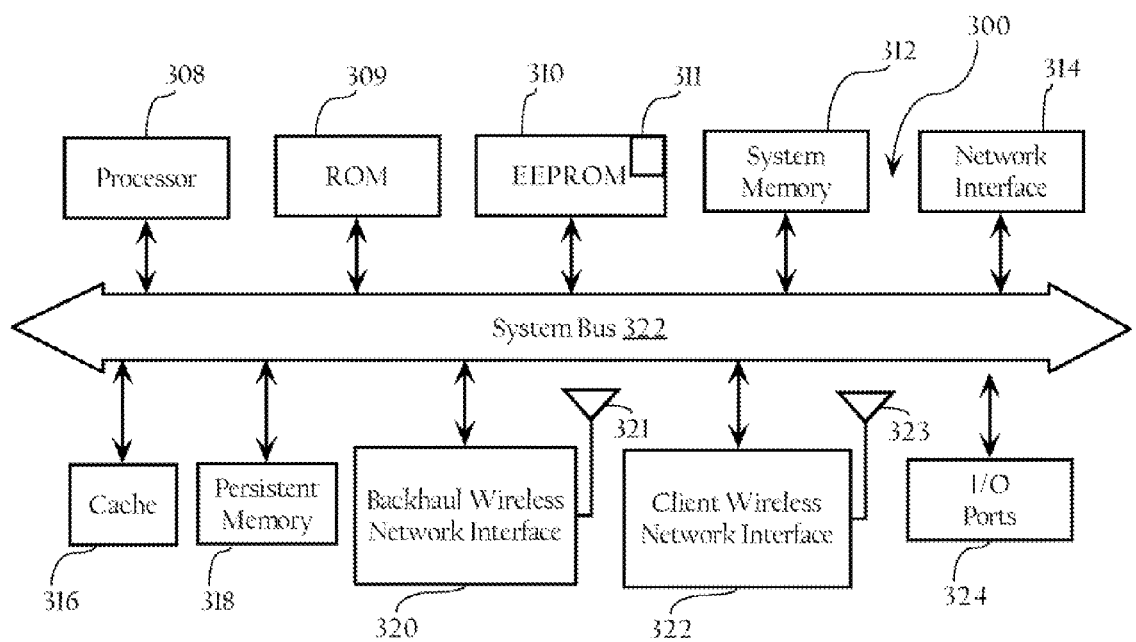
Fig._3A
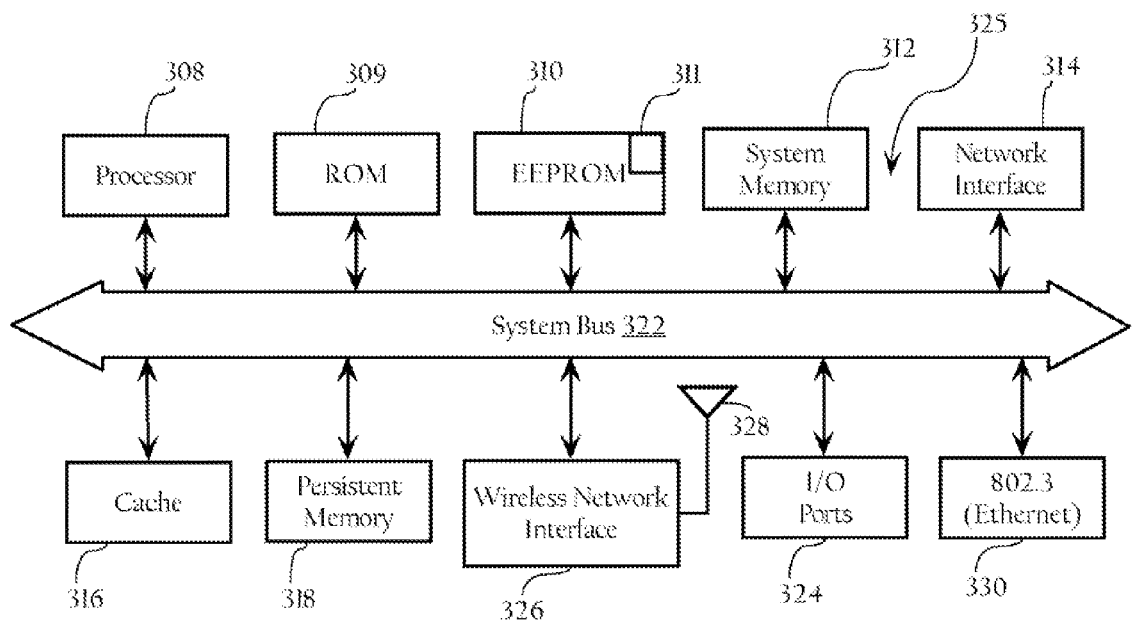
Fig._3B

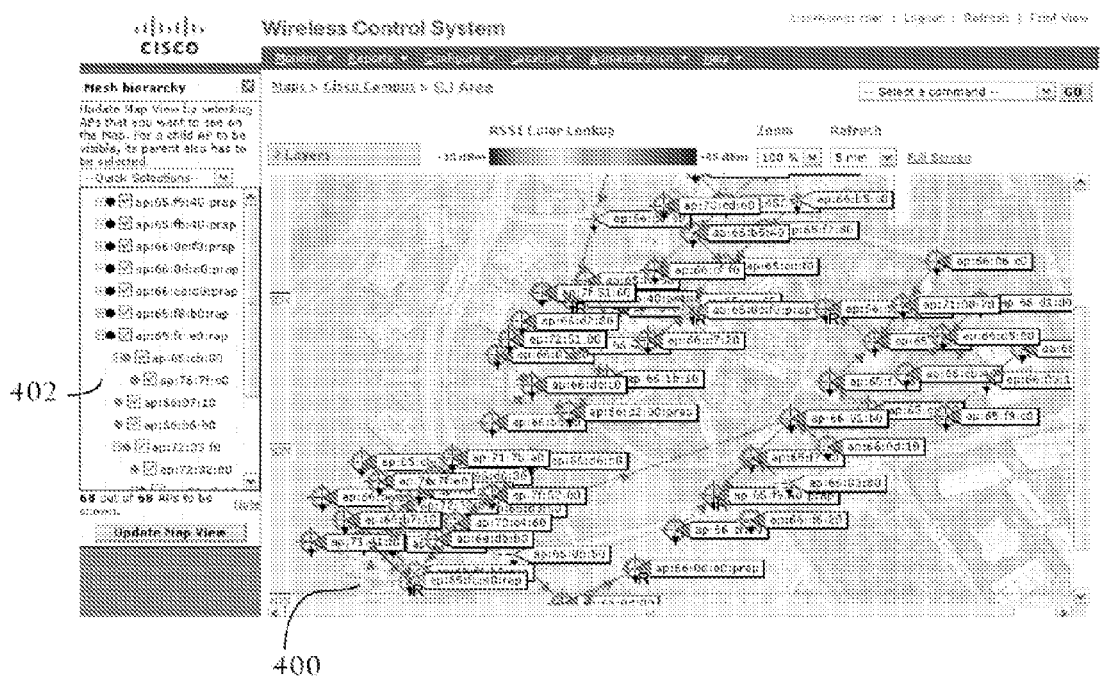
Fig._4

Javascript Object Model:
/* JAVASCRIPT OBJECT MODEL */

```
/* Object Representing AccessPoint
function AccessPoint(id,x,y,macAddr,name){
    this.id                = id;
    this.x                 = x;
    this.y                 = y;
    this.macAddr           = macAddr;
    this.name              = name;
    this.location          = "";
    this.monitorOnlyMode   = 0;
    this.switchPort        = 0;
    this.switchKey         = "";
    this.adminStatus       = 0;
    this.primaryController = "";
    this.hardwareVersion   = "";
    this.softwareVersion   = "";
    this.bootVersion       = "";
    this.statsInterval     = 0;
    this.model             = "";
    this.serialNumber      = "";
    this.overallStatus     = "";
    this.dot11aRadio = null;
    this.dot11bRadio = null;
}
```

Fig._5A

```
/* Object representing Mesh Link between parent and a child AP */ function MeshLink(fromAp,toAp,type) {
    this.fromAp = fromAp;  // reference to child AP Object defined above
    this.toAp = toAp;      // reference to parent AP Object defined above
    this.macAddress = fromAp.macAddr;
    this.neighMacAddress = toAp.macAddr;
    this.neighType = type;
    this.neighState = "";
    this.neighSnr = 0;
    this.neighSnrUp = 0;
    this.neighSnrDown = 0;
    this.neighLinkSnr = 0;
    this.neighAdjustedEase = 0;
    this.neighUnadjustedEase = 0;
    this.neighRapEase = 0;
    this.neighTxParent = 0;
    this.neighRxParent = 0;
    this.neighPoorSnr = 0;
    this.neighLastUpdate = "";
}
```

Fig. 5B

```
/* Object representing Outdoor Area Map */ function OutdoorArea (id,name,contact,key,imageUrl,x,y,width,height){
    this.id       = id;
    this.name     = name;
    this.contact  = contact;
    this.key      = key;
    this.imageUrl = imageUrl ;
    this.x        = x;
    this.y        = y;
    this.width    = width;
    this.height   = height;
    this.status   = 0;
    this.totalAps = 0;
    this.aRadios  = 0;
    this.bRadios  = 0;
    this.oosRadios = 0;
    this.clients  = 0;
}
```

GRAPHICAL SELECTION OF INFORMATION DISPLAY FOR WIRELESS MESH HIERARCHIES

CROSS-REFERENCE TO RELATED APPLICATIONS AND PATENTS

This application claims priority to U.S. provisional patent application Ser. No. 60/809,689, filed May 31, 2006.

TECHNICAL FIELD

This disclosure relates generally to wireless networks and graphical user interfaces.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their networks. To improve visibility and management in wireless networks such as wireless mesh networks, some systems can graphically display a parent-child routing configuration hierarchy including links connecting parent nodes to child nodes in a geographical map. However, when a large number of wireless nodes are displayed, it may be difficult to clearly see the relationships among the wireless nodes.

DESCRIPTION OF THE DRAWINGS

FIG. 2 illustrates an example hardware system, which may be used to implement a mesh network management server.

FIGS. 3A and 3B illustrate an example hardware system, which may be used to implement a wireless access point.

FIG. 4 illustrates an implementation of a graphical user interface showing a geographical map and a logically arranged filter.

FIGS. 5A, 5B, and 5C illustrate example object definitions.

DESCRIPTION OF EXAMPLE EMBODIMENTS

A. Overview

Particular embodiments of the present invention provide a map that shows information characterizing one or more attributes of wireless nodes of a hierarchical mesh network. In one particular implementation, a graphical user interface provides a geographical map illustrating locations of respective wireless nodes, and shows logical links between the wireless nodes. In particular implementations, the graphical user interface provides a logically arranged filter that shows a hierarchical configuration (i.e., a tree view) of the wireless nodes. In one implementation, the filter enables a user to select which wireless nodes to display or not display in the geographical map. In one implementation, a mesh network management server receives from a user a filter selection based on a wireless node grouping. The grouping may include, for example, a family of wireless nodes (i.e., a root wireless node and descendent nodes). The mesh network management server then displays in the geographical map a subset of the wireless nodes of the mesh based on the filter selection. In another implementation, a mouse-over functionality enables a user to highlight selected wireless nodes and to view information (e.g., wireless node name, signal strength, etc.) associated with the selected wireless node by mousing over those wireless nodes.

B. Example Wireless Mesh Network System Architecture

B.1. Network Topology

Figure 1:
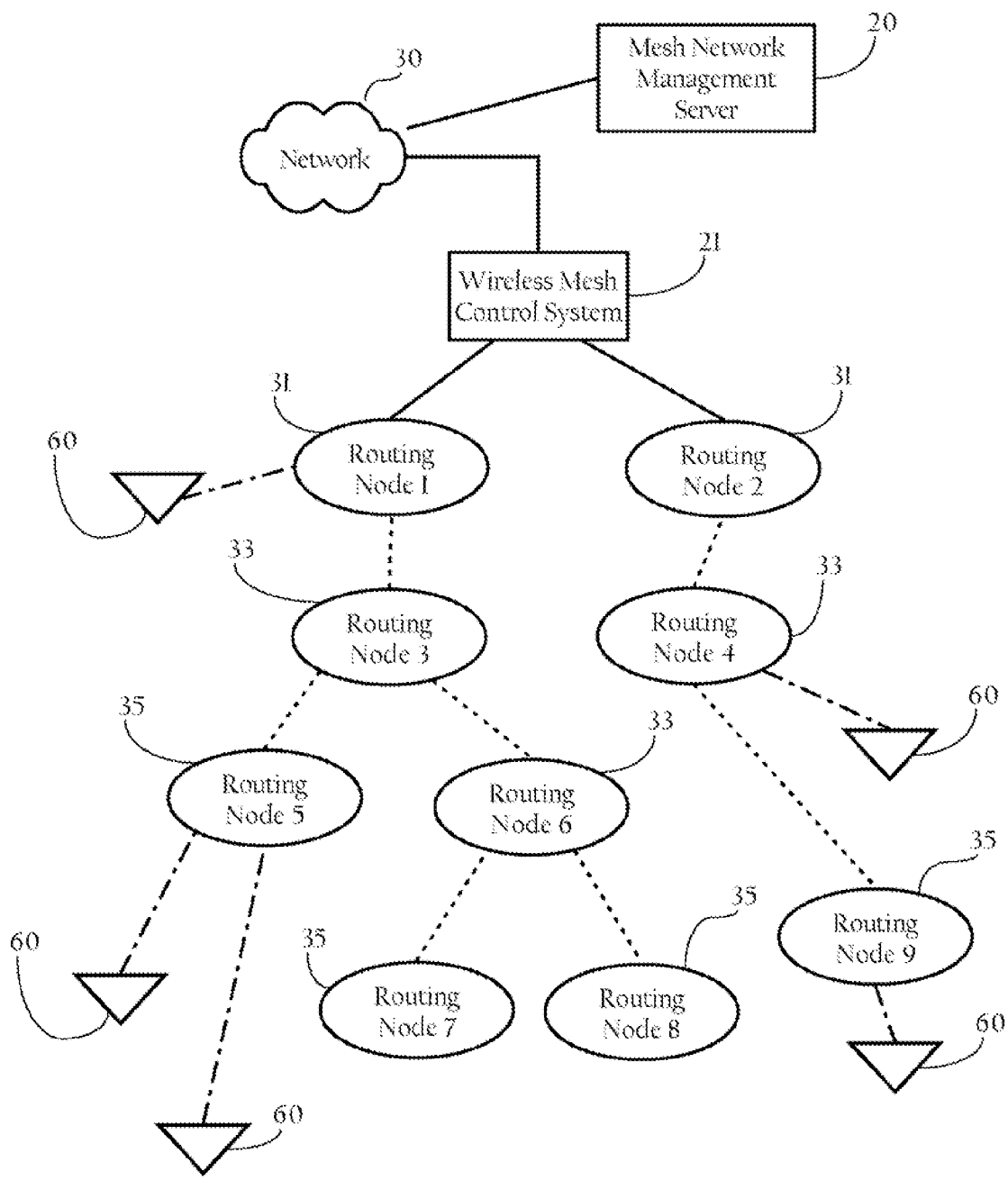
FIG. 1 illustrates an example topological diagram of a hierarchical wireless mesh network.

FIG. 1 illustrates a wireless mesh network according to one implementation of the present invention. In one implementation, the wireless mesh network includes a wireless mesh management server 20, a wireless mesh control system 21, and a plurality of routing nodes, also referred to as wireless mesh access points. In one implementation, the wireless mesh access points are logically arranged in a hierarchy for purposes of routing traffic to the root routing node, or root access point (RAP), and on to a network. In one implementation, this hierarchy can be dynamically configured and shifted based on discovery of wireless management messages between wireless mesh access points, or statically configured.

In one implementation, a hierarchical architectural overlay is imposed on the mesh network of routing nodes to create a downstream direction towards leaf routing nodes 35, and an upstream direction toward the root routing nodes 31. For example, in the hierarchical mesh network illustrated in FIG. 1, first hop routing node 1 31 is the parent of intermediary routing node 3 33. In addition, intermediate routing node 3 33 is the parent to leaf routing node 5 35, and intermediate routing node 6 32. In one implementation, this hierarchical relationship is used in routing packets between wireless clients 60, or between wireless clients 60 and network 30. In the wireless mesh network illustrated in FIG. 1A, the routing nodes are arranged in two hierarchical tree structures—one root node is routing node 1, while the other root node is routing node 2. Of course, a variety of wireless mesh network configurations are possible, including non-hierarchical configurations, and hierarchical configurations with fewer or greater number of hierarchical tree structures.

The routing nodes in the mesh network, in one implementation, generally include one radio, operating in a first frequency band, and associated wireless communication functionality to communicate with other routing nodes to thereby implement the wireless backbone, as discussed more fully below. All or a subset of the routing nodes, in one implementation, also include an additional radio, operating in a second, non-interfering frequency band, and other wireless communication functionality to establish and maintain wireless connections with mobile stations, such as wireless client 60. For example, in 802.11 wireless packets between each other using the 802.11a protocol on the 5 GHz band, while the second radio on each wireless node may interact with wireless clients on the 2.4 GHz band (802.11b/g). Of course, this relation can also be reversed with backhaul traffic using the 802.11b/g frequency band, and client traffic using the 802.11a band. In addition, the mesh routing nodes may include only a single radio or additional radios.

In one implementation, some wireless mesh networks can include a controller and a plurality of mesh nodes that are configured into one or more routing and control hierarchies based on automatic neighbor and route discovery protocols. In some environments, individual mesh nodes automatically discover their neighbors and configure hierarchical routing configurations by selecting parent nodes based on a variety of factors. Mesh nodes, in some systems, connect to a wireless controller through one or more parents nodes in the routing hierarchy.

B.2. Mesh Network Management Server

FIG. 2 illustrates an example hardware system 200, which may be used to implement a mesh network management server 20. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require not include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of the wireless mesh management server 20 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

B.3. Wireless Mesh Access Point

FIG. 3A illustrates for didactic purposes a hardware system 300, which may be used to implement a wireless mesh access point in a wireless mesh network. In one implementation, the wireless mesh access point 300 comprises a processor 308, a read-only memory (ROM) 309, and an electronically erasable read-only memory (EEPROM) 311 including reserved memory space 311 for storing network management information including physical environment and parameter (PEP) information. PEP information may include, for example, antenna orientation, global positioning system (GPS) position, altitude, and height above the ground, etc. The wireless mesh access point 300 may also include one or more of the following: a memory 312, a network interface 314 (e.g., an 802.3 interface) for communication with a LAN, a cache 316 for storing WLAN information, and a persistent memory 318. The wireless mesh access point 300 may also include a backhaul wireless network interface 320 having an antenna 321. Backhaul wireless network interface 320 is configured to transmit and receive messages to/from one or more other wireless mesh access points in a mesh network. The wireless mesh access point 300 may also include a client wireless network interface 322 (e.g., an IEEE 802.11 WLAN interface) having an antenna 323. Client wireless network interface 322 is configured for wireless communication with one or more wireless clients 60. The wireless mesh access point 300 may also include and a system bus 322 interconnecting these components, input/output (I/O) ports 324, and an optional administration or control port (326).

In operation, client wireless network interface 322 captures network management information from a wireless client (e.g., a laptop) for storage in EEPROM 311, and backhaul wireless network interface 320 transmits the EEPROM information to the wireless network management system. In some implementations, wireless mesh access point use one or more of the following standards: WiFi/802.11, WiMax/802.16, 2G, 3G, or 4G Wireless, Bluetooth/802.15, Zigbee, or any other suitable wireless communication standards. In one implementation, wireless mesh access point may have a separate access radio, and associated interface components, for communicating with a wireless client or other portable computer.

The wireless mesh access points may also include software modules, including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310. In one implementation, the wireless mesh access point includes software or firmware modules for recognizing the reception of network management information (e.g., PEP data) and for storing such information in memory (e.g., EEPROM 310).

FIG. 3B illustrates for didactic purposes a hardware system 325, which may be used to implement a wireless mesh access point in a wireless mesh network, in accordance with another implementation. In one implementation, the wireless mesh access point 325 may have similar components to that of wireless mesh access point 300 of FIG. 3A except that wireless mesh access point 325 of FIG. 3B includes wireless network interface 326 and antenna 328 instead of backhaul wireless network interface 320, antenna 321, client wireless network interface 322, and antenna 323. Furthermore, wireless mesh access point 325 also includes an 802.3 (Ethernet) interface 330.

C. Graphical User Interface for Wireless Mesh Networks

Particular embodiments provide a graphical user interface that provides information characterizing one or more attributes of wireless mesh nodes in a mesh network. In one implementation, the graphical user interface facilitates the viewing of links or associations among wireless mesh nodes in a mesh network with relevance to geographic location, as well as hierarchical routing relationships. As described in more detail below, a geographical map displays wireless mesh access points, and a logically arranged filter displays a parent-child hierarchy of the wireless mesh access points in a tree view. The logically arranged filter facilitates a selective generation of map-based views of various aspects of the mesh network that enables a user to more clearly view selected aspects, elements, portions or relations in the mesh hierarchy.

In one implementation, the mesh network management server 20 is operative to collect information regarding the wireless mesh nodes (such as position information, status, current parent-child associations, load, and the like) and store them in a database. A variety of network management and data collection protocols can be used, such as Simple Network Management Protocol (SNMP). In one implementation, users may access the network management information maintained by mesh network management server 20 using a general- or special-purpose client application hosted on a client computer. For example, using a browser, a user may access mesh network management server 20 which includes HTTP server functionality to receive requests and respond with web pages or other data, such as the displays and graphical user interfaces described herein.

C.1. Geographical Map

FIG. 4 illustrates an implementation of a graphical user interface showing a geographical map 400 and a logically arranged filter 402 according to one implementation. As FIG. 4 illustrates, the graphical user interface can display the geographic location, and other information, of a plurality wireless mesh nodes in a mesh network. In this example, the geographical map 400 displays an unfiltered view of all wireless mesh access points in a mesh network within the displayed region, since all wireless mesh access points are selected as shown in the logically arranged filter 402. The graphical user interface may also include other elements, such as status icons and link elements illustrating logical parent-child associations between mesh nodes. The logically arranged filter is described in more detail below in connection with FIG. 6. The geographical map 400 shows a mesh hierarchy view of the wireless mesh access points arranged geographically. The geographical map 400 also shows links among the wireless mesh access points, including links showing parent-child relationships.

In one implementation, to display the wireless mesh access points in the geographical map, the wireless mesh management server 20 may utilize Asynchronous JavaScript and XML (AJAX) applications to make remote procedure calls (RPCs) and extract object definitions from a database. In one implementation, object definitions may include outdoor area information, campus information, wireless mesh node information, mesh link information for parent-child links, etc.

FIGS. 5A, 5B, and 5C illustrate example object definitions for a wireless mesh node, mesh link, and outdoor area, respectively. In one implementation, the RPC dynamically generates a Javascript file that contains a plurality of object definitions. During an initial loading of the geographical map, a client (e.g., a web browser running HTML/Javascript code) of the wireless mesh management server 20 fetches the object definitions. In one implementation, the client may render Dynamic HyperText Markup Language (DHTML) based geographical maps by laying out an object representing an outdoor area and then superimposing on the outdoor area object, objects representing wireless mesh nodes (Access Points or APs) and objects representing links between wireless mesh access points, and other information such as wireless access point identifiers.

C.2. Logically Arranged Filter and Tree View

As FIG. 4 shows, the parent-child relationships among the wireless mesh access points in the mesh hierarchy, as well as status information, may be difficult for a user to discern, especially as the number of wireless mesh access points increases. As described in more detail below in connection with FIG. 6, the logically arranged filter enables a user to control the displayed view of the geographical map such that it displays desired views of the mesh hierarchy of wireless mesh access points and parent-child links.

Figure 6:
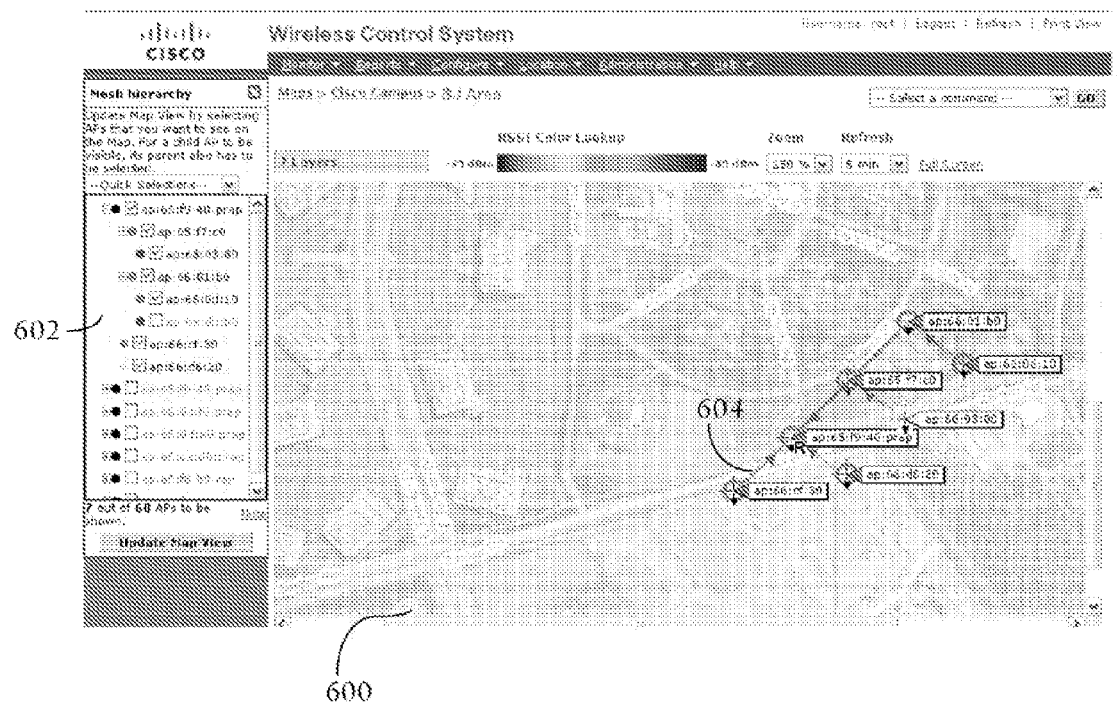
FIG. 6 illustrates an implementation of a graphical user interface showing a geographical map and a logically arranged filter.

FIG. 6 illustrates an implementation of a graphical user interface showing a geographical map 600 and a logically arranged filter 602 according to one implementation. In one implementation, the filter 602 may be a tree based filter arranged according to a parent-child hierarchy in a tree view. For example, as FIG. 6 shows, the filter 602 shows a family of wireless mesh access points associated with a single root wireless access point, where one wireless access point is deselected. In one implementation, the filter 602 displays a parent-child hierarchy of the wireless mesh access points without reference to geographic position. This enables a user to see the parent-child relationships in the mesh hierarchy in a top-down easy-to-read tree view, and to select various aspects of the mesh hierarchy for display in the geographical map 600. As discussed above, in one implementation, the parent-child relationships of the mesh hierarchy may change dynamically in response to node failures, characteristics of the RF environment, etc. Accordingly, in such implementations, the logical hierarchy illustrated in the filter is assembled dynamically based on current informations.

As FIG. 6 shows, for each root wireless access point or parent wireless access point, the filter 602 includes a checkbox next to the wireless access point so that a user can select whether to show or to hide the wireless access point, and its descendants, on the geographical map. The checkboxes enable the user to make a selection of which wireless mesh access points the user wants to see on the geographical map. In one implementation, if a given wireless access point is set to be hidden, all of its descendant wireless mesh access points (e.g., children, grandchildren, etc.) may be set to be hidden as well. For example, in one implementation, the filter may simplify the hierarchical information by displaying the root wireless access point and graphically collapsing its descendents.

In one implementation, an icon such as a colored shape next to each root wireless access point may represent the link status (e.g., connected, etc.) and may have the same color coding as links 604 among wireless mesh access points shown on the geographical map.

In one implementation, the user may select wireless mesh access points in the filter that the user is interested in viewing, and conversely, unselect wireless mesh access points that the user is not interested in viewing. In one implementation, filter selections may include groupings based on performance attributes (e.g., weak links, packet loss rate, etc.). Filter selections may also include other parameters such as all of the children related to a given wireless mesh access points, all of the neighbors that a given wireless mesh access points sees, etc. In one implementation, the filter may provide wireless access point groupings for the user to select. Examples of such filter selections may include:

Select only 1st hop wireless mesh access points;
Select up to 2nd hop wireless mesh access points;
Select up to 3rd hop wireless mesh access points;
Select up to 4th hop wireless mesh access points;
Select only root wireless mesh access points;
Select the children of the wireless access point;
Select wireless mesh access points having weak links; and
Select all wireless mesh access points.

In one implementation, if a child wireless access point is to be selected, the wireless mesh management server 20 may require the user to select a parent wireless access point all the way to root wireless access point in order to not confuse the user with orphan child wireless mesh access points.

After the user make a selection, the user may then click on an Update Map View button to update the view in the geographical map. As described on more detail below, after the user clicks on the Update Map View button, the WLAN management system updates the geographical map such that it only shows the selected wireless mesh access points.

Figure 7:
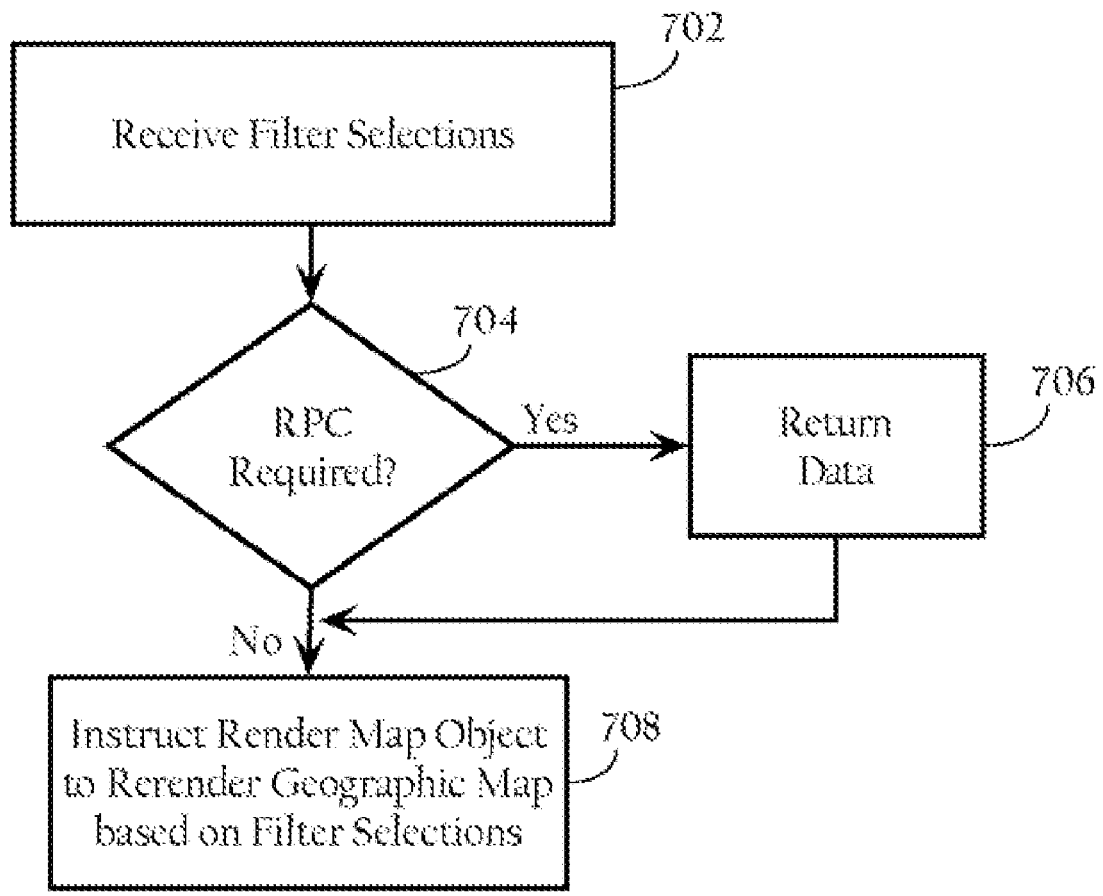
FIG. 7 illustrates an example method associated with filter selections.

FIG. 7 illustrates an example method associated with filter selections. As FIG. 7 shows, the wireless mesh management server 20 receives filter selections (702). The wireless mesh management server 20 then determines if an RPC (e.g., AJAX) is required (704). If yes, the wireless mesh management server 20 utilizes the RPC to return the appropriate object data (706). The wireless mesh management server 20 then instructs a render map object to re-render geographical map based on the filter selections (708). For example, the geographical map may show only the root wireless mesh access points or only the wireless mesh access points having more than 3 hops. In one implementation, because the geographical map already renders some objects such as an outdoor area object from the initial loading of the geographical map, the client of the wireless mesh management server 20 needs to fetch only new object definitions during the update. The client may then superimpose the newly fetched objects (e.g., objects for selected wireless mesh access points) on the outdoor area object.

The geographical map 600 of FIG. 6 shows example results of an updated geographical map 600, where only the selected wireless mesh access points are shown based on the filter 602. As FIG. 6 shows, the filter 602 updates the geographical map 600 to enable the user to view wireless mesh access points for a selected part of the mesh network (e.g., a given root wireless access point family). Views wireless mesh access points of interest would otherwise be difficult to view when all of the wireless mesh access points are displayed. In one implementation, updating the geographical map may gray out the unselected wireless access point(s) and may also automatically gray out their associated child node(s)/descendant(s). The cleaned-up view in the geographical map also facilitates a user in troubleshooting, as the user can quickly determine the hierarchical relationships among wireless points.

In one implementation, the graphical user interface may be configured to allow for the reverse use case where a user may activate or select one or more wireless access point icons in the geographic view that either select, display or hide the corresponding wireless access point elements in the hierarchical filter view.

C.3. Mouse-Over Functionality

In one implementation, a mouse-over functionality enables the user to view information for particular wireless mesh access points and their links (e.g., wireless access point names, link status, signal strength, etc.). In one implementation, when the user mouses over a given object (e.g., uses the mouse to place the cursor over a given wireless access point), the following process is executed.

Figure 8:
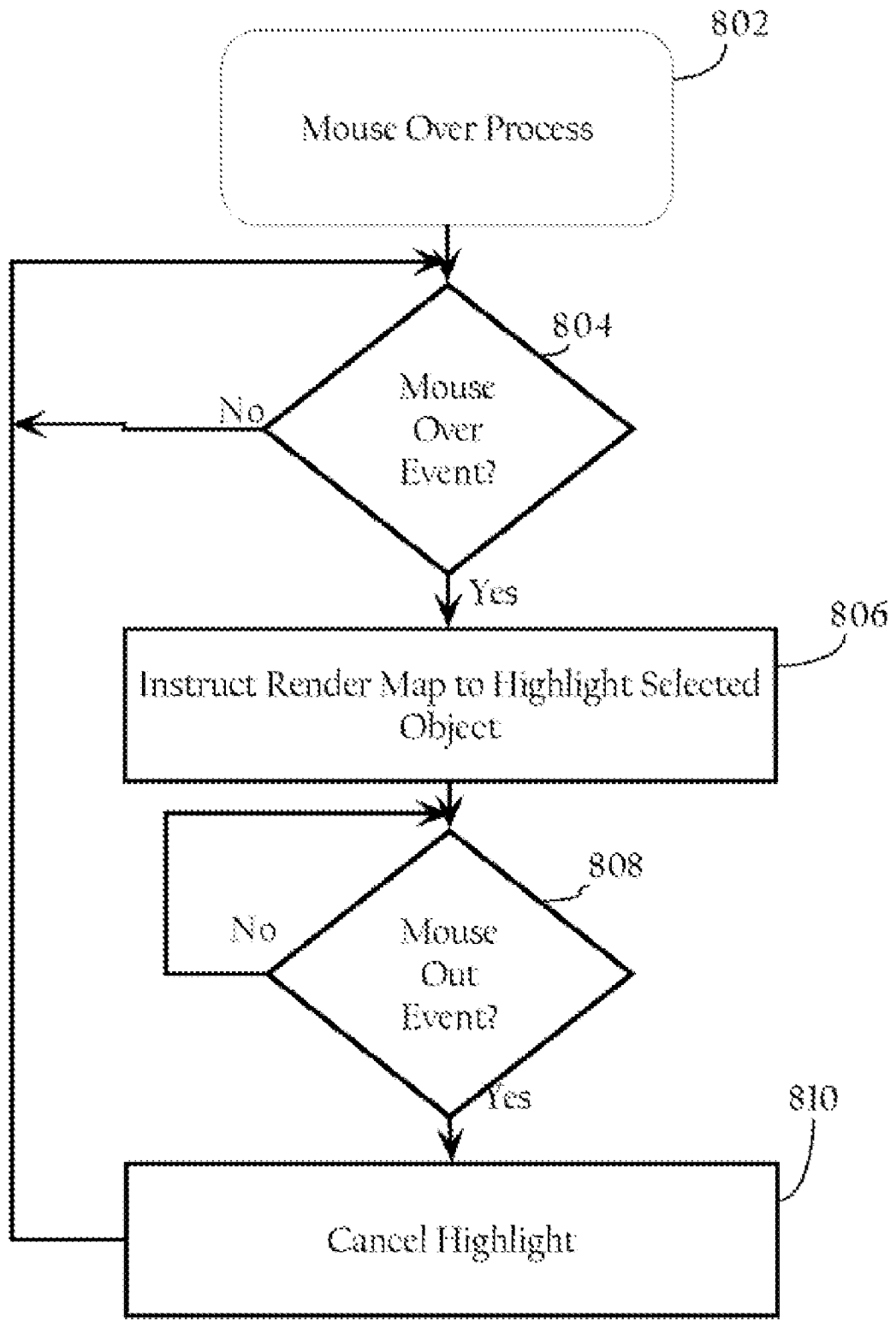
FIG. 8 illustrates another example method associated with filter selections.

FIG. 8 illustrates an example method associated with filter selections. As FIG. 8 shows, the wireless mesh management server 20 determines if there is a mouse-over event (802), the wireless mesh management server 20 instructs the render map to highlight the selected object and, in response, the render map highlights the selected object (804). If the mouse-over event ends ("mouse out") (806), the wireless mesh management server 20 instructs the render map to cancel the highlighting of the selected object (808).

Figure 9:
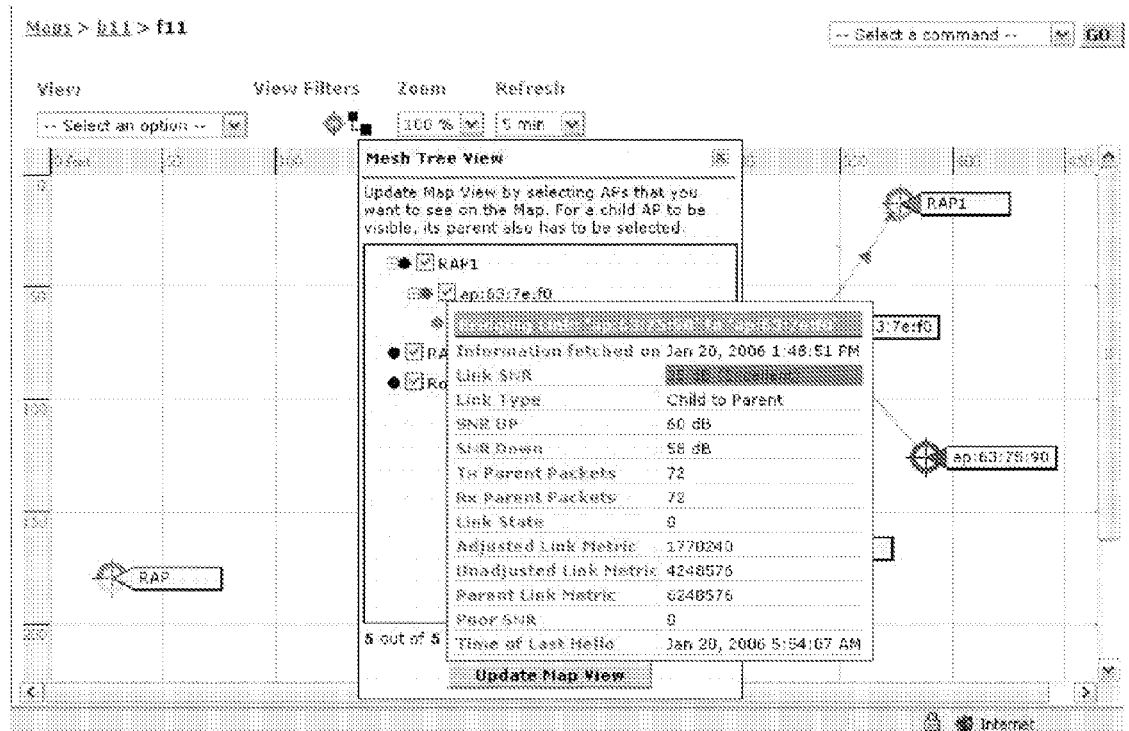
FIG. 9 illustrates example results from a mouse-over functionality.

FIG. 9 illustrates example results from the mouse-over functionality. As FIG. 9 shows, while a selected wireless access point is highlighted, a popup window appears and provides information about the selected wireless access point and linkage information. In one implementation, the popup window may include a status icon next to each child node to indicate the strength of the link to its parent. In one implementation, the status icon may be color coded (e.g., red, green, yellow, etc.) and may provide a visual indication of link strength in the filter. In one implementation, clicking on a wireless access point in the filter will highlight the wireless access point in geographical map view. In addition, the map view may be scrolled accordingly to bring the wireless access point in a readily visible map area.

In one implementation, the mouse-over functionality may highlight the selected wireless access point and/or cause the selected wireless access point to blink in the geographical map. In one implementation, the mouse-over functionality may also show a popup window with information associated with the selected wireless access point. In one implementation, if the selected wireless access point is hidden behind other wireless mesh access points, the selected wireless access point may be displayed in front of the other wireless mesh access points. In one implementation, the geographical map may be auto-scrolled to bring the selected wireless access point in the center if the display. This is useful when the selected wireless access point is among many in a large geographical map.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. Logic encoded in one or more tangible media for execution and when executed operable to:
    display a geographical map illustrating locations of a plurality of wireless mesh routing nodes of a hierarchical wireless mesh network;
    display a hierarchically-arranged filter that shows a hierarchical relation of the plurality of wireless mesh routing nodes;
    receive a filter configuration resulting from selection of one or more attributes of the hierarchically-arranged filter; and
    display in the geographical map a subset of the plurality of wireless mesh routing nodes based on the filter configuration.

2. The logic of claim 1 wherein the hierarchically-arranged filter includes one or more wireless mesh routing node groupings, each including one or more of the plurality of wireless mesh routing nodes, defined by one or more tree-based attributes.

3. The logic of claim 2 wherein the wireless mesh routing node grouping comprises wireless mesh routing nodes of a predefined number of hops.

4. The logic of claim 2 wherein the wireless node grouping comprises at least one parent wireless mesh routing node and one or more children of the parent wireless mesh routing node.

5. The logic of claim 1 wherein the hierarchically-arranged filter shows link elements illustrating logical parent-child associations between wireless mesh routing nodes.

6. The logic of claim 1 wherein the logic is further operative to display information associated with a given wireless mesh routing node or link between wireless mesh routing nodes when a user mouses over the wireless mesh routing node.

7. The logic of claim 6 wherein the information comprises status information of the wireless mesh routing nodes.

8. The logic of claim 6 wherein the information comprises link attribute information between wireless mesh routing nodes.

9. A method comprising:
    displaying a geographical map illustrating locations of a plurality of wireless mesh routing nodes of a hierarchical wireless mesh network;
    displaying a hierarchically-arranged filter that shows a hierarchical relation of the plurality of wireless mesh routing nodes;
    receiving a filter configuration resulting from selection of one or more attributes of the hierarchically-arranged filter; and
    displaying in the geographical map a subset of the plurality of wireless mesh routing nodes based on the filter configuration.

10. The method of claim 9 wherein the hierarchically-arranged filter includes one or more wireless node groupings defined by one or more tree-based attributes.

11. The method of claim 10 wherein the wireless mesh routing node grouping comprises wireless mesh routing nodes of a predefined number of hops.

12. The method of claim 10 wherein the wireless mesh routing node grouping comprises at least one parent wireless mesh routing node and one or more children of the parent wireless mesh routing node.

13. The method of claim 9 wherein the hierarchically-arranged filter shows link elements illustrating logical parent-child associations between wireless mesh routing nodes.

14. The method of claim 9 further comprising displaying information associated with a given wireless mesh routing node or link between wireless mesh routing nodes when a user mouses over the wireless mesh routing node.

15. The method of claim 14 wherein the information comprises status information of the wireless mesh routing nodes.

16. The method of claim 14 wherein the information comprises link attribute information between wireless mesh routing nodes.

17. A network management server comprising:
    one or more processors;
    a memory;
    a network interface; and
    a management application, physically stored in the memory, comprising instructions operable to cause the one or more processors and the network management server to:
    gather information relating to a status of a plurality of wireless mesh routing nodes in a hierarchical wireless mesh network; and
    transmit page-based interfaces to clients, wherein the page-based interfaces comprises embedded program code operative to:
        display a geographical map illustrating locations of the plurality of wireless mesh routing nodes;
        display a hierarchically-arranged filter that shows a hierarchical relation of the plurality of wireless mesh routing nodes;
        receive a filter configuration resulting from selection of one or more attributes of the hierarchically-arranged filter; and
        display in the geographical map a subset of the plurality of wireless mesh routing nodes based on the filter configuration.

18. The network management server of claim 17 wherein the hierarchically-arranged filter includes one or more wireless node groupings defined by one or more tree-based attributes.

19. The network management server of claim 18 wherein the wireless mesh routing node grouping comprises wireless mesh routing nodes of a predefined number of hops.

20. The network management server of claim 18 wherein the wireless mesh routing node grouping comprises at least one parent wireless mesh routing node and one or more children of the parent wireless mesh routing node.

21. The network management server of claim 17 wherein the hierarchically-arranged filter shows link elements illustrating logical parent-child associations between wireless mesh routing nodes.

22. The network management server of claim 17 wherein the embedded program code is further operative to display information associated with a given wireless mesh routing node or link between wireless mesh routing nodes when a user mouses over the wireless mesh routing node.

23. The network management server of claim 22 wherein the information comprises status information of the wireless mesh routing nodes.

24. The network management server of claim 22 wherein the information comprises link attribute information between wireless mesh routing nodes.

* * * * *